(12) United States Patent
Pinckney et al.

(10) Patent No.: US 6,388,375 B1
(45) Date of Patent: May 14, 2002

(54) DISPLAY PANEL BACKPLATE

(75) Inventors: Linda R. Pinckney, Corning; Ronald L. Stewart, Elmira; Donald M. Trotter, Jr., Newfield, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/516,802

(22) Filed: Mar. 1, 2000

Related U.S. Application Data

(63) Continuation-in-part of application No. 09/300,116, filed on Apr. 27, 1999, now abandoned
(60) Provisional application No. 60/085,122, filed on May 12, 1998.

(51) Int. Cl.$^7$ .................................................. H01J 1/62
(52) U.S. Cl. ........................................ 313/493; 313/422
(58) Field of Search ................................ 313/422, 493, 313/495, 582; 501/1, 4, 11

(56) References Cited

U.S. PATENT DOCUMENTS

| 3,252,778 A | 5/1966 | Goodman et al. |
| 3,524,748 A | 8/1970 | Beall |
| 4,304,603 A | 12/1981 | Grossman et al. |

*Primary Examiner*—Vip Patel
(74) *Attorney, Agent, or Firm*—Milton M. Peterson

(57) ABSTRACT

A backplate for a display panel, a display panel embodying such backplate, and methods for producing the backplates. The backplate comprises a thin layer of a glass-ceramic that receives the active display material on its surface, the glass-ceramic being sufficiently refractory to withstand a processing temperature of at least 850° C., that has a coefficient of thermal expansion over about $40 \times 10^{-7}/°$ C., but not over about $100 \times 10^{-7}/°$ C., and that has a crystal phase selected from spinel, enstatite, wollastonite, diopside, mullite, alpha-quartz, sapphirine, forsterite, beta-quartz, other alkaline earth metal silicates and aluminosilicates and mixtures of these crystal phases.

19 Claims, 1 Drawing Sheet

DISPLAY PANEL BACKPLATE

This application claims the benefit of U.S. Provisional Application, Serial No. 60/085,122, filed May 12, 1998 entitled EMISSIVE DISPLAY PANEL, by Ronald L. Stewart and Donald M. Trotter, and U.S. application Ser. No. 09/300,116 filed Apr. 27, 1999 by Linda R. Pinckney, Ronald L. Stewart and Donald M. Trotter entitled DISPLAY PANEL BACKPLATE.

FIELD OF THE INVENTION

Backplates for display panels, display panels embodying such backplates, and methods for producing the backplates.

BACKGROUND OF THE INVENTION

Flat panel, information displays may be of an emissive or non-emissive nature. Emissive displays, such as electroluminescent and plasma displays, characteristically respond to stimulation from an external source. This stimulation makes or modifies the light that they emit to present an image for viewing. Non-emissive displays, such as liquid crystal displays, modulate light from an external source.

Both types of displays essentially consist of front and backplates. Active, structured layers of material between the plates generate, or modulate, light.

Transmissive, non-emissive displays require high optical transparency in both plates. This permits passage of light from an external source. Emissive displays, as well as reflective, non-emissive displays, also require a front plate of high optical transparency to permit passage of light for viewing. Glass sheets are typically used for front plates in each type of display panel.

The backplate for an emissive, or a reflecting, non-emissive display, however, does not need to transmit light. Therefore, it need not be transparent. Indeed, to enhance the light emitted through the front plate for viewing, it can be advantageous to have a reflective backplate.

In any display, the front and backplates are sealed together, often at a relatively high temperature. Further, in many applications, material patterns on the two plates must remain in registration over a range of temperatures. Therefore, it has become common practice to form both plates of the same material, for example, the same glass. This ensures a good match of thermal expansions when a seal is made.

The present invention arose in connection with electroluminescent (EL) displays. Accordingly, particular attention is given to such displays, and to the solution of problems in their production. However, the broader applicability of the invention to other displays will become apparent.

An electroluminescent display consists of an electroluminescent phosphor layer sandwiched between two conducting electrodes. At high voltages, a form of breakdown occurs which causes currents to pass through the phosphor. As a consequence, the phosphor emits light.

Voltages tend to be quite high, that is, greater than 100 volts. Since the phosphor layers are quite thin, the electric fields are very high. To limit current, the displays are typically operated on alternating currents by inserting a dielectric, insulating layer. Current passes on each half-cycle until the capacitance of the device is charged.

The capacitance is proportional to the dielectric constant of the material divided by the thickness of the layer. Therefore, with a material having a high dielectric constant, the thickness of the layer can be greater. This is beneficial since the thicker layer is less prone to manufacturing defects, such as pinholes.

Present EL display panels have row and column electrodes arranged orthogonally with respect to each other. These electrodes are connected to drivers through contact at the periphery of an insulating substrate. Each pixel, then, is defined by a row and column intersection.

Traditionally, EL displays have been fabricated on ceramic or glass substrates. Glass substrates provide the required electrically insulating characteristics, but the transparency provided by glass is unnecessary in the backplate of an EL display panel. Also, glasses are generally not sufficiently refractory to withstand the temperatures involved in material processing.

Consequently, the requirements of an EL display panel are somewhat different from those of a non-emissive display panel. The active materials are formed on the backplate, for example by silk-screening, and are not environmentally sensitive. The front plate essentially acts as a shield against damage to the active material, and no accurate registration needs to be maintained between the plates. With the need for a thermal expansion match relaxed, the front and backplates may be bonded together with a simple, compliant, polymer material.

The manufacture of an inorganic, EL display panel typically involves one of two processes, depending on the thickness of the active material layer. In one process, a thin film is vacuum deposited on the plate surface, and this is followed by an annealing step. The other process involves silk-screening a thick film on the plate and firing to produce an adherent layer. Either process, requires that the back plate, upon which the material is applied, withstand a high temperature, albeit for a short time. Typically the cycle is about 850° C. for about fifteen minutes.

Sheets of ordinary glass are not sufficiently refractory to withstand such processing temperatures. As used herein, "refractory" means that a material is capable of withstanding a temperature on the order of 850° C. without undergoing destructive, chemical or physical change, or distortion.

The problem just noted with glass has led to use of high temperature ceramics, since transparency is not required. For example, tape cast, alumina sheets have been employed as backplates. Also, vitreous silica has been proposed. Except for the latter, glasses generally lack the required refractoriness.

It is difficult and expensive to manufacture either sintered alumina or vitreous silica sheets. When the sheet size has a diagonal measurement greater than about 20 cm. (8 inches), the process becomes prohibitively expensive. Also, such large alumina sheets tend to be insufficiently flat for silk-screening, or other patterning processes. Vitreous silica has a very low CTE. This makes it difficult to fire a thick film pattern on the sheet without cracking. A CTE greater than $40 \times 10^{-7}/°$ C., and preferably in the range of $40-100 \times 10^{-7}/°$ C., is considered necessary.

The desire for larger EL display panels makes it imperative that an alternative, substrate material be provided. It is a basic purpose of the present invention to meet this need. Another purpose is to provide a novel backplate for an emissive display panel. A further purpose is to provide a backplate for an EL display panel that is readily produced in relatively large sizes. A still further purpose is to provide a backplate for an EL display panel that is mechanically rugged, and that is sufficiently refractory to withstand a processing temperature of at least 850° C.

SUMMARY OF THE INVENTION

The invention resides, in part, in a backplate for a display panel comprising a thin layer of a glass-ceramic that receives the active display material on its surface, the glass-ceramic being sufficiently refractory to withstand a processing temperature of at least 850° C., that has a coefficient of thermal expansion greater than 40, but not over about $100 \times 10^{-7}/°$ C., and that has a crystal phase selected from spinel, enstatite, alpha-quartz, beta-quartz, sapphirine, forsterite, cristobalite, sanbornite, wollastonite, diopside, mullite and mixtures of these crystal phases.

The invention also resides in a display device comprising a display panel having a backplate as just described.

The invention further resides in a method of producing a backplate for a display panel which comprises melting the precursor glass for a glass-ceramic that has a crystal phase selected from spinel, enstatite, alpha-quartz, beta-quartz, sapphirine, forsterite, cristobalite, sanbornite, wollastonite, diopside, mullite and mixtures of these crystal phases, forming a sheet of said glass, heat treating the glass sheet to produce uniform crystallization throughout the sheet.

BRIEF DESCRIPTION OF THE DRAWINGS

In the accompanying drawing.

DESCRIPTION OF THE INVENTION

Figure 1:
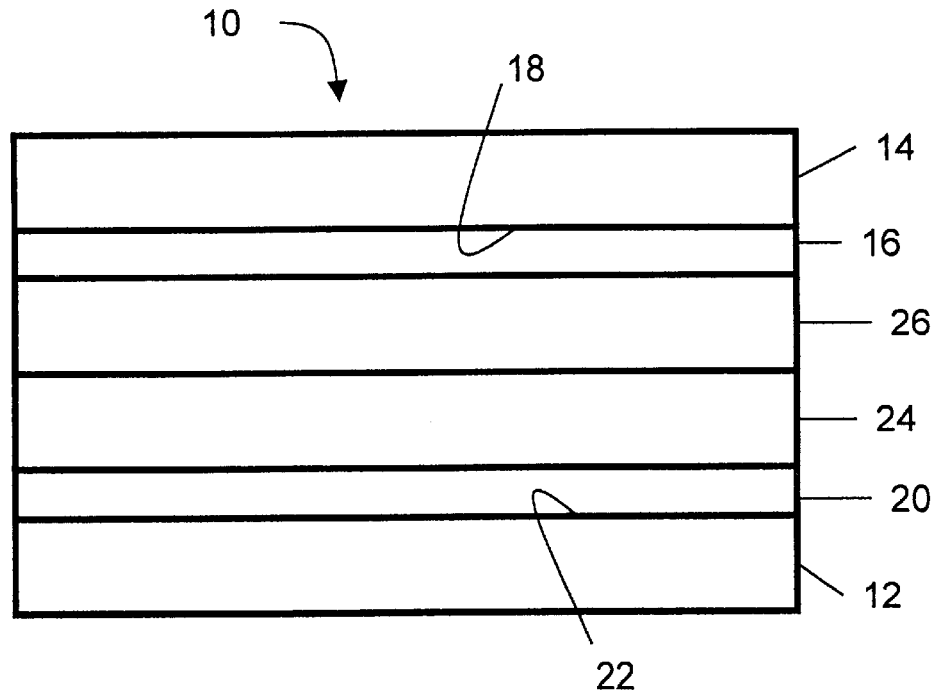
FIG. 1 is a side view of a typical EL display panel illustrating the present invention.

The present invention arose from a need for a refractory material to replace alumina in the backplate of a display panel. The need was critical for a material that could be produced in large sheet form for use in large size panels, in particular, panels having a diagonal measurement greater than 20 cm. (8 inches).

It has been found that the need can be met with selected glass-ceramic materials. These materials may be employed either as a thin sheet of glass-ceramic as such, as a coating on a metal base, or as a sintered sheet. The invention will be described, initially, with respect to the free-standing, glass-ceramic sheet aspect.

Alumina, the material previously used in producing a backplate, has a CTE of about $70 \times 10^{-7}/°$ C. Accordingly, display device processing was geared to materials having a CTE compatible with alumina. Thus, it has been deemed desirable that a replacement material for alumina have a CTE as close to that of alumina as feasible in order to minimize processing changes. Thus, an ideal replacement material would have a CTE approaching $70 \times 10^{-7}/°$ C. However, other required properties, and material availability, may not permit such an ideal, replacement material. In order to accommodate these factors, it has been found that the replacement material for alumina may have a CTE that deviates by up to 30 points greater or less than the alumina value. Thus, a potential candidate should have a CTE in the range of $40–100 \times 10^{-7}/°$ C.

While a backplate need not transmit light, it must be relatively smooth. This is necessary to permit uniform silk-screening, or other applications, of the active components for a display device. Of great importance is refractoriness, that is, the ability to withstand a processing temperature on the order of 850° C. This refractory requirement essentially eliminates glasses other than vitreous silica.

It has been found that certain glass-ceramic composition families are capable of meeting the requirements for a display panel backplate. Lack of a need for light transmission permits use of non-transmissive materials for this purpose. These glass-ceramics can be initially formed in large, glass sheets. With careful processing, these glass sheets can then be cerammed, that is, caused to undergo controlled crystallization of the glass to form crystalline phases throughout the glass.

A suitable glass-ceramic material will be chemically durable, and will be sufficiently viscous at 850° C. to undergo minimal distortion in a period of fifteen minutes. The latter is a condition imposed by processing of other materials in a display device. The precursor glass must be one that lends itself to a cost-effective, manufacturing process.

Glass-ceramic families of particular interest are alkaline earth aluminosilicate compositions, generally free of alkali metals. They provide CTEs over about $40 \times 10^{-7}/°$ C., but not over about $100 \times 10^{-7}/°$ C., have the required refractory character as indicated by high strain points, good chemical stability and potentially have high elastic moduli. These families are characterized by crystal phases of spinel, enstatite, forsterite, alpha-quartz, beta-quartz, sapphirine, cordierite, wollastonite, diopside, mullite, other silicates of the alkaline earth metals, solid solutions of such silicates and mixtures of these crystal phases. Minor amounts of other crystal phases, such as titanates, are not excluded and may be present.

The inventive, glass-ceramic backplate for a display panel may be produced by three different methods. In one method, a large sheet of precursor glass for the glass-ceramic is produced, for example, by rolling or using a float process. A second method involves coating a metal sheet with the precursor glass, and ceramming the glass coating. The third method involves converting the precursor glass to powder or granules, and molding the powder or granules in a shallow mold. The molded material is then sintered and converted to the glass-ceramic state by thermal treatment. The invention is described in terms of these methods.

Glass-ceramic sheets are produced employing conventional ceramming practice as is well known in the art. A precursor glass is first batched, melted and formed as sheets. The forming may be by rolling, or by the float process. The glass sheet is then converted to the glass-ceramic state by internal nucleation with nucleating agents in the glass. The ceramming is accomplished by subjecting the glass to a thermal treatment having a time-temperature, crystallizing cycle appropriate to the particular glass.

The invention is further described with reference to the accompanying drawing wherein FIG. 1 is a side view of a typical EL display panel. The panel illustrates the present invention and is generally designated by the numeral 10.

Display panel 10 comprises a backplate 12 and a front plate 14. Front plate 14 has a transparent electrode 16 applied over its interior surface 18. Backplate 12 has an electrode 20 applied on its interior surface 22. The respective electrodes may be electrically conductive films applied as parallel strips on the plates in an orthogonal pattern with respect to each other.

A layer of dielectric material 24 is applied over the electrode 20 on backplate 12. A layer of electroluminescent material 26 is applied over dielectric layer 24 followed by transparent electrode 16 on front plate 14. An AC current from an external source is supplied across panel 10 between electrodes 16 and 20 to activate the EL material.

The present invention is concerned only with backplate 12. It is not concerned with the electroluminescent materials, or with the electrode films, or with the means of applying the materials and films. Accordingly, no effort is made to further describe these matters since adequate information is readily available in the literature.

TABLE I, below, sets forth composition ranges for three glass-ceramic composition families that have been successfully tested to produce EL display panel backplates. Glass-ceramics in family A are characterized by a predominant, spinel-type, crystal phase. Glass-ceramics in family B are characterized by a mixture of spinel and enstatite crystal phases. Glass-ceramics in family C are characterized by a mixture of enstatite and beta-quartz solid solution crystal phases. Each of these families is typically free of alkali metal oxides.

TABLE I

| weight % | (A) Spinel | (B) Spinel-Enstatite | (C) Enstatite Beta-Quartz s.s. |
|---|---|---|---|
| $SiO_2$ | 40–70 | 35–60 | 40–68 |
| $Al_2O_3$ | 10–35 | 10–35 | 8–32 |
| ZnO | 4–25 | 0–25 | — |
| MgO | 0–12 | 4–30 | 8.5–23 |
| $TiO_2$ | 0–10 | 5–20 | 7–14 |
| $ZrO_2$ | 0–10 | 0–10 | 0–10 |

Figure 2:
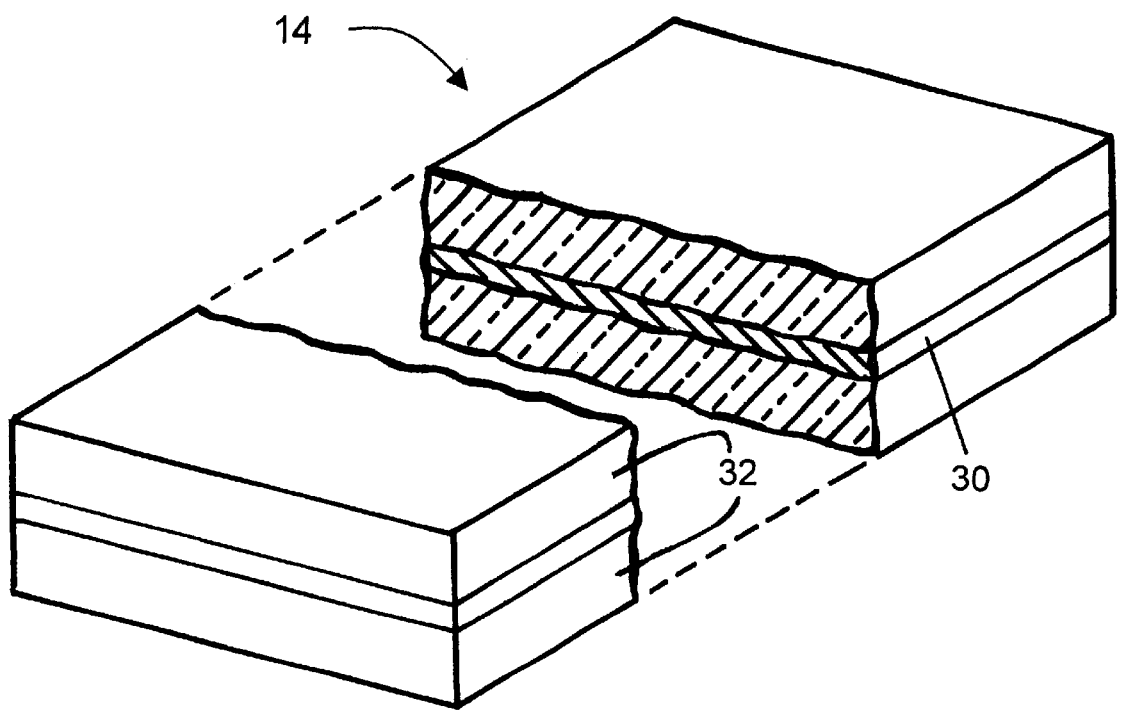
FIG. 2 is a perspective view of an alternative form of EL display panel in accordance with the invention.

FIG. 2 illustrates an alternative form that backplate 14 may take. In this form, backplate 14 comprises a thin strip, or sheet, 30 of a refractory metal or metal alloy. A glass-ceramic layer 32 covers both faces of metal strip 30. The size of strip 30 will depend on the size panel produced. Heretofore, substrates have been limited to a diagonal measurement of less than 20 cm. (8 inches). It is a feature of the present invention that larger sizes can be readily produced employing either a glass-ceramic sheet or a glass-ceramic layer on a metal base.

In the interest of conserving space and weight, refractory metal strip 30 will be as thin as is consistent with other requirements. Primarily, this will depend on whether or not the strip must be sufficiently inflexible to resist bending, or other distortion, during subsequent processing. Where distortion is not a problem, a thin roll of foil up to about 0.01 cm (a few mils) thick might be used in a continuous process. The foil would be coated, dried, fired and re-rolled for storage or shipping.

The coated roll could be cut to size before, or after, further processing. In such further processing, it is contemplated that the necessary electrodes and other materials would be applied over the glass-ceramic. This would be in accordance with conventional procedures now employed on other, commercial substrates. It is also contemplated that portions of a panel might be perforated, or otherwise left uncoated, for such purposes as mounting.

Glass-ceramic coating 32 is produced by initially applying a glass coating over both faces of metal strip 30. The glass is one that is thermally convertible to a glass-ceramic coating. This means that the glass can be uniformly crystallized in situ to a certain degree by thermal treatment at the glass crystallization temperature.

There are several features that are key to success of this aspect of the present invention. First, the glass must form a continuous coating on the metal that is essentially defect-free and relatively uniform in thickness. This is particularly true where the panel is used for image display. There, light spots, caused by pinholes, or thin spots in the coating, would be especially detrimental. Another feature is the glass-ceramic character of the ultimate coating. This is necessary to permit use of temperatures of 850° C. and higher in processing.

Finally, both faces of metal strip 30 are coated. It is, of course, desirable that coefficients of thermal expansion (CTEs) be relatively closely matched. However, even with a close match, there may be a tendency for the panel to warp or curl during processing. This, of course, is unacceptable where image display is involved. With both faces of metal strip 30 evenly and equally coated, the tendency is for any effect of expansion difference to occur equally on both faces and thus cancel out.

Basically, coating 32 is produced by applying a coating of glass particles, and thermally softening the glass to wet the metal and form a continuous, adherent, glass coating thereon. The glass is one capable of being converted to a glass-ceramic state by uniform crystallization in situ with thermal treatment. The glass-coated metal strip is then heated at the crystallization temperature of the glass for a time sufficient to effect the desired conversion to the glass-ceramic state.

Suitable, precursor glasses include alkaline earth metal oxide silicates, borosilicates and aluminosilicates. The modifying alkaline earth metals may be barium, strontium, magnesium, zinc, and/or calcium, either alone or in combination. Alkali metal oxides are preferably avoided, except as impurities in glass batch material. These oxides tend to reduce refractoriness, and also tend to introduce undesired electrical conductivity.

Certain glass families containing alkaline earth metal oxides have proven particularly useful for present purposes. One family is the barium aluminosilicate family; another is the strontium-nickel aluminosilicate family. A barium aluminosilicate glass, when converted to the glass-ceramic state, will have primary crystal phases of sanbornite and cristobalite and a minor phase of $BaAl_2Si_2O_8$. The composition family will consist essentially in weight percent of 20–65% BaO, 25–65% $SiO_2$, and up to 15% $Al_2O_3$. A strontium-nickel aluminosilicate glass-ceramic will contain primary crystal phases of $SrSiO_3$ and $Ni_2SiO_4$, and a minor phase of cristobalite. The glass family will consist essentially, by weight, of 20–60% SrO, 30–70% $SiO_2$, up to 15% $Al_2O_3$ and up to 25% NiO.

Another glass family of interest is based on mixed alkaline earth, borosilicate glasses containing zinc oxide. These glasses will, when crystallized, have a primary phase of BaO—2MgO—2$SiO_2$, or, if a substantial amount of $Al_2O_3$ is present, hexacelsian. This family consists essentially of, in weight percent on an oxide basis,

| $SiO_2$ | 25–40 | BaO | 10–60 |
|---|---|---|---|
| $B_2O_3$ | 5–30 | MgO | 10–35 |
| $Al_2O_3$ | 0–15 | CaO | 0–15 |
| $Al_2O_3$ + CaO + ZnO | 5–20 | ZnO | 5–20 |

TABLE II sets forth, in weight percent on an oxide basis, as calculated from the precursor glass batch, the compositions for several different glass-ceramics having properties that adapt them to use for present purposes. Examples 1–6 illustrate alkaline earth metal aluminoborates or borosilicates. Examples 7–10 illustrate alkaline earth metal silicates which may contain minor amounts of alumina or zirconia.

TABLE II

| Ex. | $SiO_2$ | $B_2O_3$ | $Al_2O_3$ | BaO | MgO | CaO | ZnO | $ZrO_2$ | SrO | NiO | F |
|---|---|---|---|---|---|---|---|---|---|---|---|
| 1 | 15.0 | 23.5 | 0.2 | 17.9 | 39.1 | 0.3 | — | 2.9 | 0.3 | — | 0.8 |
| 2 | — | 25.4 | 18.6 | 56.0 | — | — | — | — | — | — | 6 |
| 3 | 31.8 | 13.2 | — | 16.5 | 24.5 | — | 14.0 | — | — | — | — |
| 4 | 9.6 | 22.2 | 32.5 | — | — | 35.8 | — | — | — | — | — |
| 5 | 30.6 | 12.7 | 3.8 | 15.9 | 23.5 | — | 13.5 | — | — | — | — |
| 6 | — | 27.0 | 19.8 | 29.7 | 7.8 | — | 15.8 | — | — | — | — |
| 7 | 65.0 | — | 6.9 | — | — | — | — | — | 28.1 | — | — |
| 5 | 47.2 | — | — | — | — | — | — | 12.1 | 40.7 | — | — |
| 9 | 54.1 | — | 5.7 | — | — | — | — | — | 23.3 | 16.8 | — |
| 10 | 62.7 | — | 5.3 | 32.0 | — | — | — | — | — | — | — |

The third method, the glass sintering method, embodies elements of both methods just described. The precursor glass is provided in powder or particulate form and sintered to form the desired thin, glass-ceramic sheet. A glass composition, and processing conditions, are chosen so that the glass softens prior to crystallization occurring. The glass undergoes viscous sintering to full density concurrent with the crystallization process, and just before that process is completed.

In a simple form of this method, a glass melt of appropriate composition is reduced to particles by quenching. The particles are then milled to provide a relatively uniform particle size. The milled glass is then mixed with appropriate organic binders. The mix thus produced is then pressed uniformly into a wide, shallow mold, the dimension of which will depend on the desired dimension of the sheet being formed. The thus molded material is then fired in a controlled manner to first remove the binder, then densify the glass, and finally convert the glass to a glass-ceramic by crystallization.

Conventional ceramic processes, such as spraying, slip casting and extrusion, may be employed in forming the glass mixture into sheet form. The crystallization process (ceramming) takes advantage of surface crystallization. There, the relict surfaces of the glass grains serve as nucleating sites for the desired crystal phases to develop.

TABLE III, below, sets forth, in weight percent on an oxide basis, exemplary compositions for glasses that may be employed to provide sintered, glass-ceramic sheets. Sheets having these compositions possess high use temperatures, good chemical durability and a CTE value in excess of $40 \times 10^{-7}/°$ C. as shown. Also shown are the crystal phases and matrix glass phase observed in the glass-ceramics.

TABLE III

| Example | 11 | 12 | 13 | 14 |
|---|---|---|---|---|
| $SiO_2$ | 53.4 | 36.2 | 34.7 | 46.6 |
| $Al_2O_3$ | 23.3 | 34.8 | 40.7 | 4.8 |
| MgO | 5.8 | 4.2 | 6.1 | — |
| NiO | 14.6 | 3.9 | — | — |
| ZnO | — | 7.5 | 8.9 | — |
| $B_2O_3$ | 2.9 | 3.7 | 9.6 | — |
| $P_2O_5$ | — | 3.7 | — | — |
| BaO | — | 6.0 | — | — |
| CaO | — | — | — | 43.8 |
| $Nb_2O_5$ | — | — | — | 5.8 |
| Phases | spinel, cordierite, glass | spinel, mullite, glass | spinel, mullite, glass | wollastonite, glass |
| CTE $\times 10^{-7}/°$ C. | 41 | 64 | — | 67 |

The glass of composition 11 was converted to a sintered glass-ceramic by heating at 500° C./hr. to 1200° C., holding at 1200° C. for twelve (12) minutes, cooling to 1100° C., holding at that temperature for two hours and then cooling at furnace rate. The product was observed to have spine, cordierite and residual glass phases.

The glasses of compositions 12 and 13 were converted to sintered glass-ceramics by heating at 500° C./hour to 1200° C., holding at 1200° C. for two hours and then cooling. The product was observed to have spinel, mullite and residual glass phases.

The glass of composition 14 was converted to a sintered glass ceramic by heating at 300° C./hr. to 1100° C., holding at 1100° C. for two hours and cooling. The product was observed to have a wollastonite crystal phase and a residual glass phase.

The invention is further described with reference to the following specific examples:

EXAMPLE 1

A glass having a composition within family B of TABLE I was melted and a sheet formed therefrom. The composition, in weight percent, consisted of: 47.1% $SiO_2$, 22.1% $Al_2O_3$, 16.9% MgO, 1.7% ZnO and 12.3% $TiO_2$. The glass sheet was heated to a temperature of 800° C., and held at that temperature for one hour to nucleate the glass. The nucleated glass was then heated to a temperature of 1000° C., and held at that temperature for two hours, to grow crystals on the nuclei. This converted the glass to a glass-ceramic having a mixture of Mg-spinel and enstatite crystals. The glass-ceramic had a CTE of $65 \times 10^{-7}/°$ C. and a strain point of 997° C.

This glass-ceramic sheet was substituted for sintered alumina as a backplate in an EL display panel. Performance was reported to be very satisfactory.

EXAMPLE 2

A glass having a composition within family A in TABLE I was melted and a sheet formed therefrom. The composition, in weight percent, consisted of: 59.3% $SiO_2$, 19.1% $Al_2O_3$, 2.5% MgO, 9.0% ZnO, 2.1% BaO, 5.0% $TiO_2$ and 3.0% $ZrO_2$. The glass sheet was heated at a temperature of 800° C. for a period of two hours to nucleate the glass. The temperature was then raised to 1000° C., and held at that temperature for four hours to convert the glass to a glass-ceramic. The glass-ceramic had a predominant crystal phase of a Zn-rich spinel. The glass-ceramic had a CTE of nearly $40 \times 10^{-7}/°$ C. and a strain point of 910° C. With small changes in the processing conditions, this glass-ceramic sheet was successfully substituted for sintered alumina as a backplate in an EL display panel.

EXAMPLE 3

A glass having a composition within family C in TABLE I was melted and a sheet formed therefrom. The composition, in weight percent, consisted of: 56.1% $SiO_2$, 19.7% $Al_2O_3$, 14.6% MgO and 8.9% $TiO_2$. The glass sheet was heated at a temperature of 820° C. for two hours to nucleate the glass. The temperature was then raised to 950° C. and held at that temperature for eight hours to convert the glass to a glass-ceramic.

The glass-ceramic thus formed had a predominant crystal phase of enstatite with a secondary beta-quartz phase. The glass-ceramic has a non-linear expansion with an average CTE of $70-100\times10^{-7}$/° C. A satisfactory display panel was fabricated with the glass-ceramic sheet as a back plate.

EXAMPLE 4

This is a comparative example to show the ineffectiveness of a non-crystallizable glass available from Corning as Code 1737. This glass is alkali-free, has a strain point of 666° C., and is used as a panel glass for LCD panels. The glass has a composition, in weight percent, consisting of: 57.7% $SiO_2$, 16.4% $Al_2O_3$, 8.9% $B_2O_3$, 0.7% MgO, 4.1% CaO, 1.9% SrO, 9.5% BaO, 0.8% $As_2O_3$.

When a sheet of this glass was substituted for sintered alumina in an EL display panel, the glass warped to such an extent during processing of the panel that it was considered unacceptable.

EXAMPLE 5

Type 430 stainless steel panels having a thickness of about 0.09 cm (0.036 inches) were obtained. Each panel was grit blasted with 100 mesh alumina at 80 psi to roughen the surface. The panels were then rinsed with distilled water and isopropanol, and air dried preparatory to coating.

A glass batch, based on composition 5 in TABLE II, was mixed in conventional manner using conventional materials. The batch was melted in a platinum container for six hours at a temperature in the range of 1400 to 1500° C. The molten glass was poured onto a steel slab and rolled to form thin, glass sheets. The sheets were broken into small pieces, ball milled and sized to provide a glass powder having a mean particle size of about 8 microns.

A slip was prepared, containing the glass powder, for application to the stainless steel panels. The vehicle for the slip was prepared by adding 100 grams of a high molecular weight polybutyl methacrylate to 500 ml of liquid solvent composed of equal parts of amyl and ethyl acetates. The mixture was heated at a low heat on a hot plate to provide a solution. The solution was poured into a Nalgene roller bottle with zirconia grinding cylinders, and 250 grams of glass powder was added. The bottle was closed and rolled at medium speed on a roller mill for about three hours. The zirconia cylinders were removed and the slip was de-aired by rolling overnight at slow speed.

The slip was applied by dipping the metal panel in the slip until fully immersed. The slip-coated panel was removed with a continuous, medium speed pull and air dried for a half hour. This dipping and drying was repeated several times to provide a weight gain, after drying, of about 32 mg/cm$^2$ (200 mg/inch$^2$).

The coated and dried panel was then heated in a muffle furnace at 1° C. rate to 500° C. to remove the binder. The coated metal panels were removed while the furnace was heated to 925° C. The panels were reinserted in the furnace at 925° C. and held at that temperature for one half hour. This converted the glass to an adherent, glass-ceramic coating on the metal panel. The coated panel was cooled in the furnace at furnace rate.

EXAMPLE 6

A substrate for an electroluminescent display panel was prepared in the manner described above in Example 4. However, the glass employed had the composition set forth in composition 3 of TABLE II. This glass is similar to that used in Example 4, but omits alumina. The glass-ceramic produced therefrom had only a single observable crystal phase, $BaO—2MgO—2SiO_2$, whereas the glass-ceramic in Example 5 also showed some $MgO—SiO_2$.

EXAMPLE 7

In this example, a panel substrate was prepared using a sheet of low carbon, enameling iron having a typical composition, in weight %, of: 0.003 C, 0.20 Mn, 0.008 P, 0.020 S and the balance, 99.7, iron. The metal sheet was carefully cleaned, and then nitric acid etched to provide a rough surface. The surface was then given a nickel flash plating to permit ultimate development of nickel oxide. This promotes adherence of the glass-ceramic coating to the metal.

A glass batch, based on composition 1 in TABLE II, was mixed in usual manner, but in relatively large amount. The batch was melted in small units and homogenized before being introduced into a larger melting unit operating at about 1400° C. This melting unit had a discharge orifice that permitted running a thin stream of molten glass onto water-cooled rollers to produce thin, glass flakes. The flakes were gathered in plastic lined jars and milled in dry propanol using zirconia cylinders in a 20:1 glass to zirconia weight ratio. This reduced the glass to a powder having a mean particle size in the range of 3–6 μm.

The glass powder was applied to the metal by electrophoretic deposition. A DC voltage was employed with an isopropanol bath having water added to boost conductivity. The positively charged, glass particles in the bath were attracted to the negatively charged, metal sheet.

The metal plate, coated with glass powder, was then dried and heated to a temperature of about 900° C. At this temperature, the glass powder sintered and, after a few minutes, formed an impervious glaze layer. An ascharite crystal phase ($2MgO—B_2O_3$) separated out in a very viscous, residual, glassy matrix.

EXAMPLE 8

A coating slip was prepared as described in Example 4, but using a glass having the composition set forth as number 10 in TABLE II. The slip was applied to a stainless steel strip by dipping and drying several times. The coated metal strip was then heated to a temperature of 1150° C. and held at that temperature to thoroughly wet, and adhere to, the metal surface. The temperature was then reduced to about 1050° C., the crystallization temperature for the glass. It was held at that temperature to effect conversion to the glass-ceramic state.

The glass-ceramic coating contained a sanbornite crystal phase and a minor phase of cristobalite. The panel just described was deemed satisfactory. However, the borosilicate glasses described in Examples 4 and 5 appeared to better wet the steel prior to any crystal formation. This would better insure against defects, such as pinholes, in a larger scale process.

Electroluminescent panels have been prepared by applying electrodes and other electroluminescing accessories on glass-ceramic coated substrates prepared as just described. The panels performed satisfactorily when operated. This indicated an adherent glass-ceramic that insulates the metal substrate and has no adverse effect on the electroluminescent material.

We claim:

1. A backplate for a display panel comprising a thin layer of a glass-ceramic that receives the active display material on its surface, the glass-ceramic being sufficiently refractory to withstand a processing temperature of at least 850° C., having a coefficient of thermal expansion in the range of about 40–100×10$^{-7}$/° C., and having a crystal phase selected from spinel, enstatite, alpha-quartz, sapphirine, forsterite, beta-quartz, wollastonite, diopside, mullite, other alkaline earth metal silicates, sanbonite, cristobalite and mixtures of these crystal phases, and being essentially free of alkali metal oxides.

2. A backplate in accordance with claim 1 consisting of a glass-ceramic sheet.

3. A backplate in accordance with claim 2 comprising a sintered, glass-ceramic sheet.

4. A backplate in accordance with claim 1 wherein the glass ceramic has a coefficient of thermal expansion in the range of 70–100×10$^{-7}$/° C.

5. A backplate in accordance with claim 1 wherein the glass-ceramic sheet has a diagonal measurement greater than about 20 cm.

6. A backplate in accordance with claim 1 wherein the panel comprises a sheet of refractory metal having a thin layer of glass-ceramic adherent to at least the interior surface of the metal sheet.

7. A backplate in accordance with claim 6 wherein the refractory metal is a stainless steel or a low carbon containing iron.

8. A backplate in accordance with claim 1 wherein the display panel is a component of an emissive device.

9. A backplate in accordance with claim 8 wherein the display panel is an electroluminescent panel.

10. A display device comprising a display panel having a backplate comprising a thin layer of a glass-ceramic that receives the active display material on its surface, the glass-ceramic being sufficiently refractory to withstand a processing temperature of at least 850° C., having a coefficient of thermal expansion in the range of about 40–100×10$^{-7}$/° C., having a predominant crystal phase selected from spinel, enstatite, wollastonite, diopside, mullite, alpha-quartz, sapphirine, beta-quartz, other alkaline earth metal silicates and mixtures of these crystal phases, and being essentially free of alkali metal oxides.

11. A display device in accordance with claim 10 wherein the display panel is an emissive display panel.

12. A display device in accordance with claim 11 wherein the display panel is an electroluminescent panel.

13. A display device in accordance with claim 10 wherein the backplate is a glass-ceramic sheet.

14. A display device in accordance with claim 13 comprising a sintered, glass-ceramic sheet.

15. A display device in accordance with claim 10 wherein the glass-ceramic has a coefficient of thermal expansion in the range of 70–100×10$^{-7}$/° C.

16. A display device in accordance with claim 10 wherein the backplate is a sheet of refractory metal having a thin layer of glass-ceramic adherent to the interior of the backplate.

17. A method of producing a backplate for a display panel which comprises melting the precursor glass for a glass-ceramic having a crystal phase selected from spinel, enstatite, wollastonite, diopside, mullite, alpha-quartz, sapphirine, forsterite, beta-quartz, alkaline earth metal silicates and mixtures of these crystal phases, forming a sheet of said glass, heat treating the glass layer to produce crystallization throughout the layer.

18. A method in accordance with claim 17 which comprises providing a thin sheet of a refractory metal, providing a glass that is capable of being converted to a glass-ceramic state having a silicate or aluminosilicate crystal phase when so converted, comminuting the glass to a powder, mixing the comminuted glass with a vehicle to form a coating slip, applying the coating slip to at least the interior face of the metal sheet, heating the coated metal until the glass softens and wets the metal to form a continuous coating thereon, thermally converting the glass to a glass-ceramic state, and cooling the coated metal.

19. A method in accordance with claim 17 which comprises comminuting the molten glass into a powder or granules, forming the comminuted glass into a sheet, and heat treating the sheet of comminuted glass to sinter the glass and convert it to a glass-ceramic state.

* * * * *